United States Patent [19]
McKean

[11] 4,453,719
[45] Jun. 12, 1984

[54] PHONETIC/SEMANTIC SYSTEMS, DEVICES AND METHODS OF CONSTRUCTING AND UTILIZING SAME

[76] Inventor: James H. McKean, 1102 Barneswood, Rochester, Mich. 48063

[21] Appl. No.: 319,458

[22] Filed: Nov. 9, 1981

[51] Int. Cl.³ .............................................. A63F 3/00
[52] U.S. Cl. .................................. 273/265; 446/121; 273/272; 273/281
[58] Field of Search .............. 46/23, 25; 235/131 FD; 273/58 K, 138 R, 146, 148 R, 265, 269, 271, 272, 281, DIG. 27; 434/84, 96, 113, 174, 119

[56] References Cited

U.S. PATENT DOCUMENTS

| | | | |
|---|---|---|---|
| 198,934 | 1/1878 | Fields | 235/131 FD X |
| 340,545 | 4/1886 | Blackhall | 235/4 |
| 2,017,473 | 10/1935 | Reimert | 273/281 X |
| 2,078,382 | 4/1937 | Hanshaw | 273/58 K |
| 2,371,325 | 3/1945 | Wessborg | 434/113 |
| 2,967,714 | 1/1961 | Calabrese | 273/271 |
| 3,464,698 | 9/1969 | Bosco | 273/146 X |
| 3,467,382 | 9/1969 | Leadley | 273/146 R |
| 3,797,829 | 3/1974 | Heller | 273/271 |
| 4,026,043 | 5/1977 | Caruso | 235/131 FD X |
| 4,222,565 | 9/1980 | Berrebi | 273/265 X |
| 4,226,420 | 10/1980 | Corday | 237/269 |

Primary Examiner—Harland S. Skogquist
Attorney, Agent, or Firm—Irving M. Weiner; Pamela S. Burt; John L. Shortley

[57] ABSTRACT

An encoding game device having a series of flexible elongated carriers including a series of compartments interconnected by reduced sections. Each compartment contains a rotatable sphere having raised binary 1's and 0's with different tactile backgrounds for visual and tactile sensing. The carriers are used in conjunction with registers for coding and decoding selected words using binary, phonetic and semantic codings.

10 Claims, 13 Drawing Figures

| CENTRAL | PARK | WAS | FULL |
|---|---|---|---|
| S-NAM/SE·K-MED/ME·N 885 - 292 - 768 | P-DJE/RE·LS-PUB/PRi 865 - 611 - 319 | W-PAST/SINS-iD/ELS 974 - 314 - 21 | F-TOT/PART-MAK/MIK 808 - 442 - 272 |
| S-ENT-TR-AL 885-166-708-11 | P-ARK 865-48 | W-AZ 974-62 | F-UL 808-467 |
| OF | STROLLERS | LAZILY | SIDDLING |
| ƆV-PART/TOT-SICH/MOD 61 - 812 - 899 | STR-TREK/SHIFT-PLEB/POL 932 - 978 - 324 | L-SLO/KWIK-LUL/ROUZ 852 918 758 | S-MOSH/STAND-TREK/ 885-259-978 SHIFT |
| ƆV 61 | STR-ƆL-ERZ 932-11-186 | L-AZ-IL-E· 852-407-246-193 | S-iD-DL-E·NG 885-219-612-205 |
| THROUGH | RECLINING | PICNICERS | |
| THR-STE·ER/STRA-TWE·N/ 956 429 481 POLZ | R-LUL/ROUZ-EKS/Wi 881 758 12 | P-FUII/PAL-PLEB/POL 865 129 324 | |
| THR-Ʊ 956-408 | R-LUL/ROUZ-EKS/Wi 881-201-718-227-205 | P-IK-KN-IK-ERZ 865-245-731-245-186 | |
| STUTTERING | SINEWAVES | WHISPERED | OF |
| ST-STUT/SPEK-OFT/SELD 931 - 949 - 5 | S-WAV/VƆLV-POZ/STiL 885-1017-303 | W-FANT/BOLD-TEL/FAK 974 636 444 | ƆV-KOR/STRANDJ-ME·NS/ 61 - 203 - 266 FAS |
| ST-UT-ER-E·NG 931-508-170-205 | S-IN-W-AV-Z 885-227-974-406-757 | W-IS-SP-ERD 974-264-669-173 | ƆV 61 |
| PROBING | INTELLIGENCE | HOUSED | IN |
| PR-SE·K/NAM-DJUDJ/ 871-892-97 PRE·DJ | INT-SMART/STUP-KEN/PUZ 260 - 420 205 | H-KLOZ/MARK-STRUKSH/ 829-709 - 439 AMB | IN-PITH/EKST-LOK/LƆST 250 - 308 - 236 |
| PR-OB-E·NG 871-74-205 | INT-EL-IG-ENS 260-138-243-165 | H-OUZ-D 829-328-737 | IN 250 |
| SOME | MICROBIONIC | NETWORK | |
| S-AMB/STRUKSH-ELS/iD 885 - 540 - 527 | M-MIK/MAK-ZO/FAN 855-770 1020 | N-KRƆS/KOL-FORM/ 861 - 714 - 112 TROP | LW VW PW |
| S-ƆM 885-27 855 | M-IK-KR-OB-i-ƆN-IK 245-712-74-216-29-245 | N-ET-TW-ERK 861-188-723-178 | |

FIG.8

| A | MASSIVE | BROWN | COW |
|---|---|---|---|
| A-PARS/PAT-DJEN/SPESH 2 - 299 - 94 | M-MAK/MIK-LOD/LEV 855 - 272 - 234 | BR-PANT/PAEL-TINT/ 773 - 317 - 456 TINKSH | K-FAN/ZO-STOK/FARM 840 - 103 - 935 |
| A 2 | M-AS-IV 855-375-268 | BR-OUN 773-316 | K-OU 840-305 |
| WAS | SEEN | GRAZING | ON |
| W-PARS/PAT-ƆLD/NE· 974 - 299 - 521 | S-VIZH/LENZ-WƲ/VAG 885-491 - 493 | GR-FƲD/PAP-FAN/ZO 820 - 127 - 103 | ƆN-PARS/PAT-TIP/BOT 29 - 299 - 457 |
| W-AZ 974-62 | S-E·N 885-204 | GR-AZ-E·NG 820-407-205 | ƆN 29 |
| THE | VERDANT | HILLSIDE | |
| tH-PARS/PAT-tHE·Z/ 943 - 299 - 466 tHƟZ | V-TINT/TINKSH-VEDJ/ 962-456 486 ViER | H-ERTH/KOSM-KLUST/ 829 - 532 - 221 SPRED | |
| tH-A 943-2 | V-ERD-ANT 962-173-36 | H-IL-LS-iD 829-246-559-219 | |
| THE | PATTERNED | SIGNAL | FROM |
| tH-PARS/PAT-tHE·Z/ 943 - 299 - 466 tHƟZ | P-STRUKSH/AMB-AM/ 865-439-31 VƟT | S-TEL/FAK-FONZ/VID 885 | FR-PARS/PAT-LE·V/ENT 810 - 299 - 745 |
| tH-A 943-2 | P-AT-ERN-D 865-376-181-737 | S-IG-GN-AL 885-243-732-11 | FR-UM 810-483 |
| DEEP | SPACE | GAVE | HOPE |
| D-DE·P/SERF-GRAT/ 796 - 594 -169 SMAL | SP-KOSM/ERTH-SPAS/ 926-198-426 NOW | G-AD/OP-NUZ/KRIPT 817 - 29 - 296 | H-YEN/NƆNCH-ƆPT/PES 829 - 34 - 6 |
| D-E·P 796-207 | SP-AS 926-402 | G-AV 817-406 | H-ƟP 829-105 |
| FOR | THE | MEETING | |
| F-PARS/PAT tHE·Z/ 808-299 - 466 tHƟZ | tH-PARS/PAT-tHE·Z/ 943-299-466 tHƟZ | M-CHUM/LƲF-NE·ER/ 855-80 - 797 FAR | LW VW PW |
| F-ƟR 808-106 | tH-A 943-2 | M-ET-E·NG 855-210-205 | |

PHONETIC/SEMANTIC SYSTEMS, DEVICES AND METHODS OF CONSTRUCTING AND UTILIZING SAME

TECHNICAL FIELD

This invention pertains to a sound based coding system for word or picture processing and a means such as a game device for employing the coding system.

BACKGROUND OF THE INVENTION

Field of the Invention

The invention particularly relates to a means for encoding language into compact "word" units and visual "symbol" units, and further, to encoding such as for computer programming. The sounds and symbols are encoded in such a manner thet they can be digitized and used in computers. The "language" can be used for robots, speaking machines, games, etc. The invention utilizes a unique system of classification of the word units and symbolized visual units using binary codes, as well as descriptors, that is descriptors, and codes, having semantic value.

According to the invention stacked and serialized arrangements of matrices representing word symbols and their coincidences are formed. The symbols are defined by phonetic sound units of natural speech. The sound units are arranged in a unique manner, the inherent modularity of which can be used for binary code entry.

The embodiment in a word expression game device, such as disclosed herein, is one possibility for use of the concepts. There are other applications, however, such as use of a game for educational purposes. The language, and the game, can be oriented, for example. to dramatic, history or english or technical fields. For example, the game concept can be useful in cryptanalysis. Raised symbolic figures and binary figures can be employed, as in the disclosed game embodiment, and these can, for example, be used for amusement for the blind.

SUMMARY OF THE INVENTION

The invention as embodied in a word game device comprises a carrier frame, in addition to the language. The frame has a plurality of serially arranged spheres rotatably mounted therein. The spheres have coded indicia spacially arranged thereon. The frame has at least one opening adjacent each sphere whereby at least one indicia of each sphere is visible exteriorly of the frame.

According to the invention, these spheres are rotatable so that selected ones of the indicia can be placed in the visible position. There are detent means for maintaining the spheres in the selected indicia displaying position. The carrier is flexible to facilitate rotation of the spheres, and has at least two openings adjacent these spheres whereby the spheres can be rotated into a desired position by manipulation from the exterior of the frame.

According to a further concept of the invention, the spheres have binary coding thereon at spaced intervals. The coding is in relief, and the surface areas of the spheres immediately surrounding some of the digits are textured differently than other areas.

The invention also contemplates a series of figure registers, at least one for each sphere, adapted to be placed closely adjacent each sphere and having binary values and symbols, i.e., figure indicia, thereon. According to the invention the carrier frame consists of an elongated member having spaced sphere receptacles and openings extending longitudinally along the member. The figure registers comprise elongated members having a series of indicias spaced therealong and are adapted to be placed in a plane extending perpendicularly of the spheres within the carrier frame, with one end of each of the figure registers being immediately adjacent a respective one of the spheres. The registers preferably comprise flat strips and have numerical identification on one side and a series of spaced indicia indicating semantic and phonetic units on the other side.

The registers have indicia suitable for three stages of figure encodements namely, phonetic, semantic and thematic or field-focus indicia, as explained hereinafter. Further, according to the invention there is provided a code guide for the registers including means providing sound, meaning, and field (contextual) definitions and related numerical and digital coding. In addition there are selected series of recording means such as sheets on which the relationship of bits to words, etc., employed, can be listed, and the processing of the game can be recorded.

BRIEF DESCRIPTION OF THE DRAWINGS

FIG. 7 is a plan view of a precodement format.

FIG. 8 is a second plan view of a precodement format.

PREFERRED EMBODIMENT OF THE INVENTION

Figure 1:
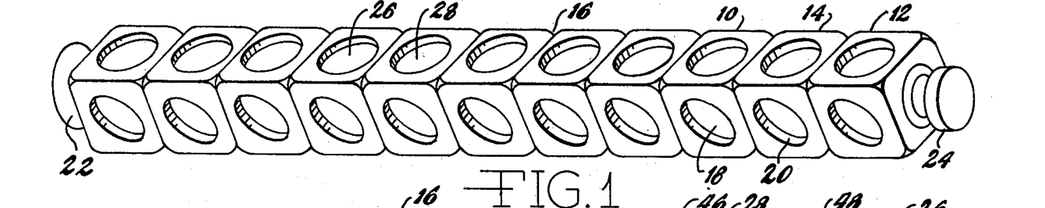
FIG. 1 is a perspective view of a carrier frame.

In its game embodiment the invention comprises a carrier frame 10 having a series of compartments, or sections, 12, 14, etc. The compartments are interconnected by reduced sections 16. The frame is of rectangular cross section and on at least one facial side it is provided with a series of openings 18 and 20. A series of eleven compartments forms a single carrier frame unit. The carrier frame unit is formed of a flexible preferably resilient material. This unit has a receptacle 22 at one end, and a plug 24 at its opposite end. The plug and receptacle are of mating sizes and the plug 24 is adapted to be received in a mating receptacle 22 on another carrier frame unit. Thus a series of carrier frames can be interconnected.

Figure 2:
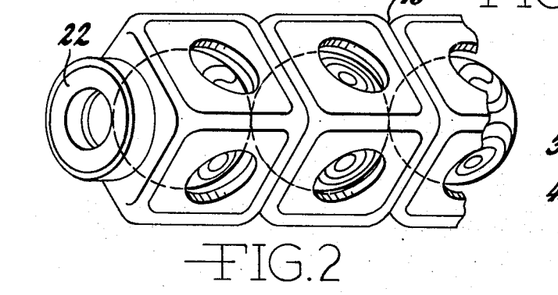
FIG. 2 is an enlarged fragmentary perspective view of a carrier frame showing spherical members therein.
Figure 3:
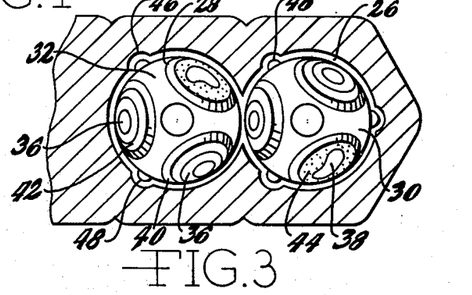
FIG. 3 is a view similar to that of FIG. 2, but showing the carrier frame in cross section so as to show the spheres in full view.

The interior of the frame, as shown in FIG. 2, has spherical chambers such as 26 and 28. A series of rotatable spheres 30 and 32 are adapted to be rotatably positioned within the spherical chambers 26 and 28. These spheres each carry indicia, six in number, with three of the indicia representing the binary digit 0, and three representing the digit 1, as shown at 36 and 38. The indicia are mounted in raised sections 40, which can be of any desired shape, preferably, as shown, they consist of circular sections. Preferably also the indicia background surrounding the digit 0 is smooth as indicated at 42 whereas, in comparison, that surrounding the digit 1 is rough as indicated at 44. Thus, visual and tactile sensing of the digits is possible.

The carrier frame is provided with a series of recesses 46 adapted to receive nodes 48 on the spheres. A series of nodes and recesses are provided, and together they serve to fix the spheres in selected positions.

The carrier is made of a flexible synthetic material and the use of the reduced connecting sections 16 improves its flexibility. At least two openings are provided in each carrier frame section, 12, 14, etc. Preferably, however, more than two openings are provided. One is provided directly opposite the other (180° apart), so that, the player can, by using his fingers, rotate the spheres from one indicia showing position to another. Preferably, also, six indicia are provided on each sphere so that an 0 or an 1 can be placed at a desired position readily.

The game requires, as described below, the manipulation of the spheres to expose selected indicia. Normally in playing the game it is preferred to position the indicia required so that they are visible through the side of the carrier frame, with each of the selected indicia being aligned and visible along the same side of the frame. Thus the frame can be placed on a table or a base and the indicia which is of significance will be visible facing to one side of the frame.

Figure 4:
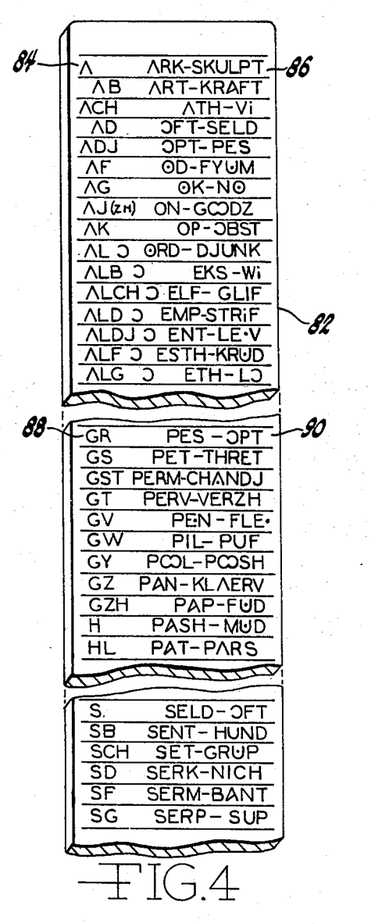
FIG. 4 is a fragmentary view of a side of a code guide, or register, showing certain indicia thereon.
Figure 5:
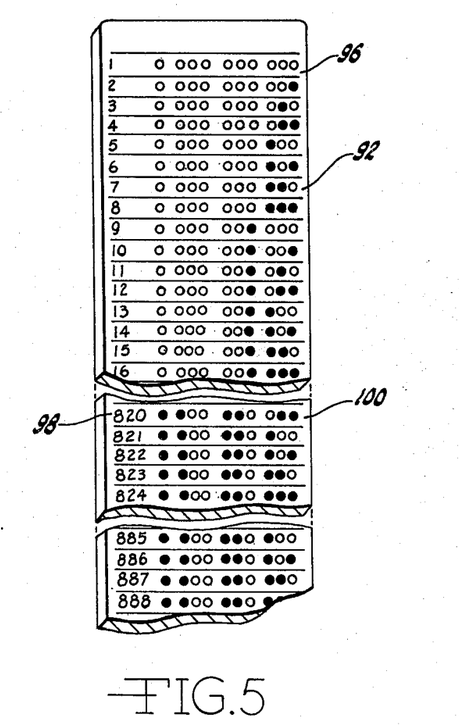
FIG. 5 is a fragmentary view of the opposite side of the register guide shown in FIG. 4.
Figure 6:
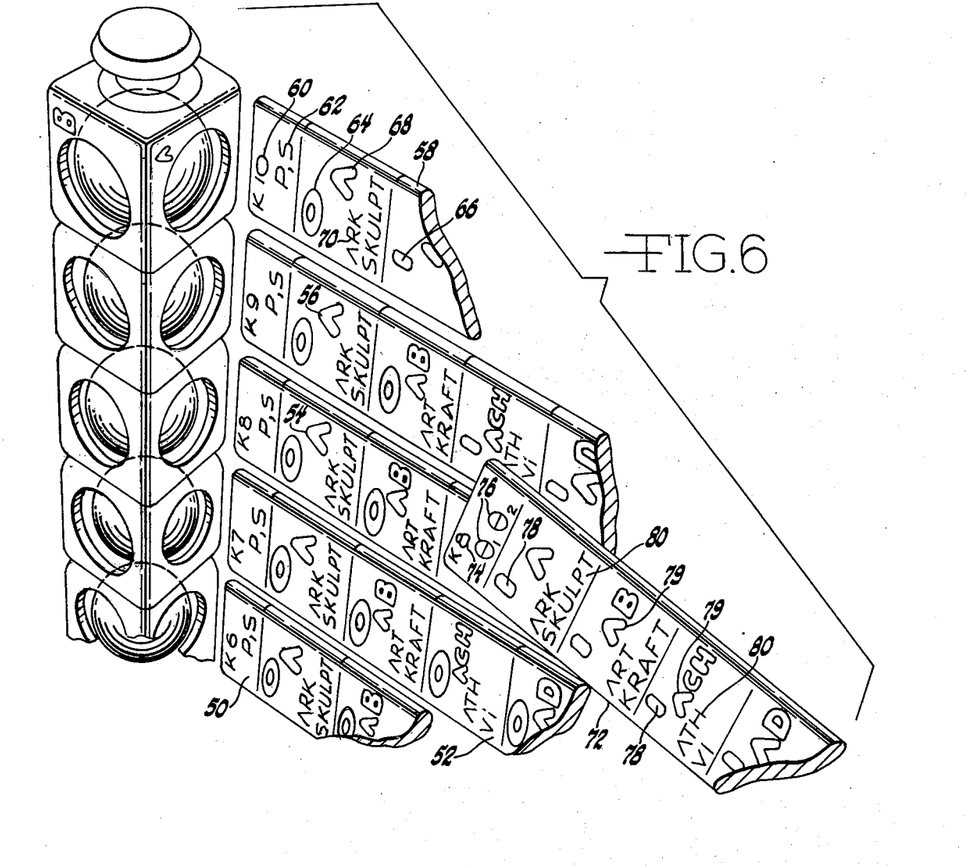
FIG. 6 is a fragmentary view showing a carrier frame with spherical members therein, and a series of carrier registers having indicia thereon including a showing of the reverse side of one of the registers.

The game further embodies a series of carrier registers 50, 52, 54, 56 and 58. These comprise a series of elongated flat members having squared ends, which have an appearance similar to that of a ruler. They are each provided with indicia such as 60. This provides a means for identifying a particular carrier register. Additional indicia are provided, such as 62, which, as described hereinafter, indicate whether the particular carrier side visible is a phonetic side or semantic side. Additional indicia 64 and 66 include the binary notations 0 and 1 respectively. Further indicia such as 68 and 70 are, respectively, phonetic symbols and semantic symbols. Also shown in FIG. 6 is a register 72. Register 72 is identified by the indicia 74 as being the register K8 of another group which can be numerically arranged.

There is further provided a series of register guides 82. These are actually complete registers, whereas the carrier registers 50, 52, 54, 56 and 58 are partial registers. Preferably, these complete registers are also flat elongated members on one side of which there are provided sound and meaning codes, such as 84 and 86, representing the sound "A", and the meanings "architectural" or "sculptural", respectively. As another example, the indicia 88 represents the "GR" sound in grazing, with the symbol 90 represents the meanings "pessimistic" or "optimistic", as will be explained. A complete register guide 82 contains, on one side, the complete coding of a series of sound (symbol) "tags" or units and meaning (compact word) "tags" or units. On the opposite side of the guides, as indicated at 92, the decimal and binary equivalence codes for the sound and phonetic indicia on the front face are given. Thus, for example, the numeral "1" 84, stands for the sound A, as well as the meaning "Ark-Skulpt" 86, whereas the digital representation of 1 and null, as at 96, stand also for the indicia 84 and 86. Likewise, the numeral 820 indicated at 98, stands for the GR sound 88, and the meaning code 90, and the binary number 100 stands for the meaning "pessimistic" or "optimistic", and the indicia 90, as well as for the sound GR. As described above, the invention in one of its aspects is based on the development of a unique set of characters which represent sound and a second set of characters which represent meaning. One set is a phonetic set of characters which represent sound and a second, set of characters which represent meaning. One set is a phonetic set, the other a semantic set. It has been discovered, and developed, that a single pair of sets of characters or tags can be provided into which the words of a language can be accommodated. Stated another way: An unique phonetic system of sound and meaning encodements has been devised by which all words of a language can be "tagged".

Thus, in a real sense a language which is useful for such encodement of words has been provided. This language is further binary coded in such a manner that it is useful for digital computer entry, i.e., address and retrieval instruction represented by one binary code number.

Usefulness in relation to a word game of amusement, as well as of educational value utilizing the above described apparatus, is only one example of its value.

The game chosen embodies the selection of codes for words from, predeveloped lists, conversion of the codes to binary form and the exposition by each player of the binary coded information to his opponent. The opponent then has the opportunity to attempt to decipher the encodements into words useful for his purpose.

The simplified game format contemplates each player trying to obtain from the exposed codes matches for the words he has already encoded for himself. Thus as player 1 puts his codes on the table, player 2 tries to "capture" these and use them to construct words and sentences which he (player 2) originally selected and encoded.

The game involves obtaining from the playing surface semantic and phonetic symbols which can be placed together to formulate a theme or series of words forming sentences which a player has previously selected as his objective "words".

To accomplish this with a semblance of order and discipline, the word groups are selected in relation to an "approved" set of themes. Thus, a set of words and sentences might relate to a certain field such as agriculture, and, within that field, focus more specifically on "cattle".

The opponent might select astronautics as a theme field, and select, as a focus thereof, "space" itself.

Then within each theme each player selects a series of words, which form sentences, descriptive in regulated manner of an event within the theme. For example, player 1 may choose the sentence "A massive brown cow was seen grazing on the verdant hillside". Whereas the other player, player "0", might select, "The patterned signal from deep space gave hope for the meeting".

The encodement, for purpose of playing the game, includes these words as well as the themes and the focuses within the themes.

The encodement is selected by reference to the register, above, on which semantic and phonetic symbols, which encompass the selected words, are found. Actually a choice of phonetic and semantic symbols will be available. Opposite each chosen symbol the numerical identity will appear and the digital coding also. On the illustrated register guides 82, the symbols are on one side and the numbers are on the reverse side. The encoding process is governed further by rules as to the words and their breakdown.

Each sentence must be of at least three words. The words must be initially "legal words", that is actual words of the language, the vernacular. The words may be broken down into their morphemes, i.e., their grammatical units, prior to selecting the phonetic and semantic descriptors which will be used. Thus, a word may be assigned a series of digital, binary numbers which will be exposed in the game, and from which the opposite players will guess what the sound and meaning tags signify. That is, the opponent will compare the digital information given to him with the digital information carrier registers such as 50. When he or she finds a match he or she will then read the semantic and phonetic symbols associated on the registers with the binary numbers. This will then be recorded by the opponent for use in creating words. As above, he will actually be seeking whole or "legal" words, or "valid" words, which can be used in formulating the words he selected in his own theme, as well as trying to decide what his opponent's words are.

The game is also rendered more sophisticated by the fact that the same set of phonetic and semantic codes are used for the theme and focus words as well as for the scenario (the action) within the theme. An opponent will not know which, and must choose as best he can. He may wish to guess at his opponent's words, etc. throughout the play for purposes of altering his own, but he can not be certain he is correct.

Points will be scored, after a certain period of play, in accordance with the number of words ("legal words") and tags of words ("valid words") which have been "captured" in play. As explained below, these are "words" which match the "words" of the captor.

In the game form illustrated, the following terms will be used:

Address: The accessing location within a storage or memory.

Bit: A two state or binary digit expressed by numerals "1" or "0", or on a sphere, such as 30, by slightly raised "0" or "1" markings.

Bit Point: The unit of the scoring system, for example, the scoring system can have have values such as:
1. a bit=1 point;
2. a byte=10 points;
3. a complete sound tagged legal word=100 points, plus 10 points for each sound unit;
4. a complete sound/meaning/field-focus tagged (valid word)=100 points, plus 30 points for each tag.

Byte: A ten-bit binary code format as expressed in a carrier frame 10.

Encoding sheets: Formatted sheets on which encodements are recorded.

Tag: A word definer, i.e. of a word.

Legal Word: A complete word in the vernacular. It must be one of (1) a verbal word, (2) a nominal word, or (3) an operator word. The first two are as in school grammar lessons. The third can be any utterance; an expletive, an article, a logical conjunctive/phrasal noun or verb not clustered around or modifying the primary verbal and primary nominal word. Each legal word requires three encoding tags, and each tag requires a ten-bit byte. One tag must be a phonetic tag, and it must be of the first phonetic in the word.

Valid Word: A three morpheme, or three tag unit, classifying a legal word. Must include one sound tag, one meaning tag, and one field/focus tag.

The game, as above, comprises the selection by each player of a theme, a focus within the theme, and then a scenario therein. Next, each player selects from the complete carrier register, the encodements for his words including the sound, and meaning, and field/focus tags with their binary designations. This is all recorded on sheets such as shown in FIGS. 7 and 8. The binary codes are then entered into sets of carrier frames by rotating the spherical elements to expose the proper digits for each code to be played. Sets of these words (codes) form sentences. The words in each set, each group of frames, are set forth by three "tags". The three tags are phonetic, semantic and field/focus tags. Three carriers are joined end to end, by utilizing the plugs 24 and receptacles 22, to form a word using the three tags. If a legal word has less than 3 phonetic tags, for example, the word "A", then dummy tags are entered. For "A" two dummy tags are needed. This is done by making all digits null for the dummy tags.

The three word "containing" carriers are associated with registers 50, et seq, in order, by one player after the other. The opponent then "reads" the associated carrier-register arrangements and records what he thinks the meanings are, as well as the actual digital information, see FIGS. 10, 11 and 12.

The game thus involves displaying digital information, based on previously recorded "words", to an opponent, the opponent recording these, and using these in creating words that he, the opponent, has previously selected. The opponent will also try to guess what the displayed information signifies to the person displaying them. Thus an opponent tries to guess what words are represented, as well as trying to use the digital information in "recreating" his own words, which he has not revealed. There is thus a double "capturing" of the digital information displayed by an opponent: (1) to use in an attempt to decipher the opponent's chosen words, and thus, his sentence, and focus, and theme, and (2) to use in recreating the precodes of his own words, theme and focus. A player records the opponent's codes on recording sheets like his own. Points are scored for repeating one's own words, as well as for deciphering the opponent's meanings. The game further involves "Playing off" sets of digital information, each player against the other, in a manner such that a winner is selected to whom all the digital information of a set, with its possible connotations, is transferred for use for both the above purposes (1) and (2).

In this manner "bits" and "bytes" are accumulated which can be combined at various times in creating words, and in scoring. With this in mind, and referring to the drawings, the following game can be played:

The game has five steps or routines:
1. The Declaration Routine;
2. The Read Routine;

3. The Bit Playoff Routine;
4. The Call Routine; and
5. The Assemble Routine.

1. The Declaration Routine entails the precoding, as above, in longhand and interlinearly the code equivalencies of the players choices for words, sentences and tags they intend to vocalize and put into play. This is done secretly, but the recorded "Declarations" are permanent records for use in the subsequent "calling" and scoring. Such records are shown in FIGS. 7 and 8.

Figure 12:
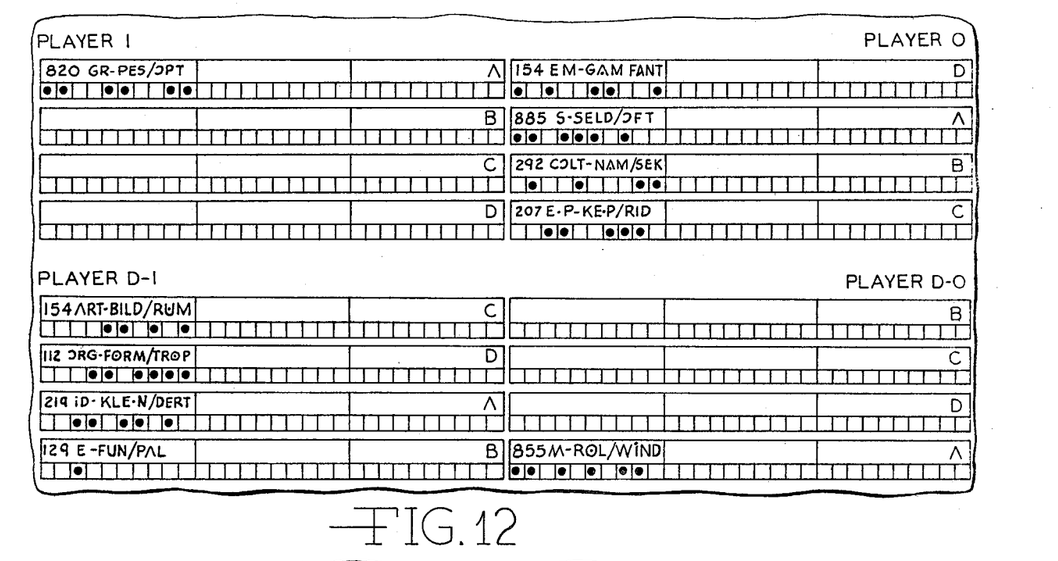
FIG. 12 is a plan view of a record sheet.
Figure 13:
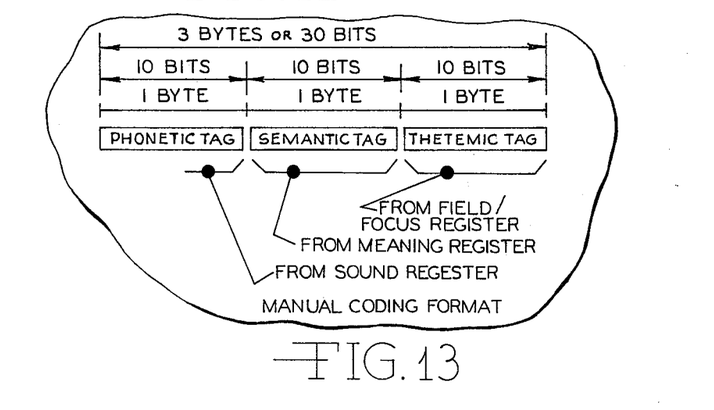
FIG. 13 is a showing of a format for the record sheet of FIG. 12.

2. The Read Routine entails the players, in turn, placing their binary coding on carrier frames, and one at a time placing the frames in association with the carrier registers, whereupon the opponent reads and records his reading on format sheets such as in FIG. 12. FIG. 6 shows the placement of the carrier frame 10 in alignment with registers 50, et seq, for this routine. Three bytes (carrier registers) are presented by each player in this routine. That is, one word at a time, shown by three bytes, is placed on the board, and the opponent records the bits on a sheet as shown in FIG. 12.

It should be remembered that each valid word has a three byte tag, identifier, or denominator. That is, a sound (phonetic) tag, a meaning tag, and a field/focus tag. In play, the three tags in their digital form are displayed to the opponent who matches the digital bytes on the carriers with those on the carrier registers with which they are aligned, reads and records the tags thereon, and uses the latter to attempt to form the words he has selected. Player 1 in this example has chosen, above in the Declaration Routine, "A massive brown cow was seen grazing on the verdant hillside." The legal word "massive" is thus one which is recorded on the player 1's Declaration sheet, as shown in FIG. 8. Beneath the legal word there is recorded the valid word for "massive", i.e., the three tags: the phonetic, the semantic, and the field/focus tags which will be put into play through their binary codes. The legal word is not disclosed until the end of the game. The phonetic tag must be that for the first phonetic sound. Here "M" is the first phonetic tag and it is recorded on the Declaration sheet together with its numerical code. Next, a selected semantic tag for "massive", namely, "macro/micro", taken from the list of approved tags on the complete register, is recorded. The numerical code number for this tag is also recorded. Then, a field/focus code, for "massive", indicating size, such as "load/levity", and its numerical code, are also recorded. During the play, three binary equivalents of the three tags will be placed on the table in alignment with the carrier registers through use of the carrier frames 10.

Beneath the valid word there is also recorded a phonetic word—the equivalent of the legal word. In this case "M AS-IV".

The complete register contains all the tags that can be used.

During the course of play, player 1 will "read" the binary numbers of the opponent's tags and attempt to decipher meanings therefrom using the carrier registers which are aligned with the carrier frames. He will record his readings and announce or call them. He is "capturing" these "words" for use in matching with, or "recreating", his own previously declared words—which is the aim of the players.

There are points for capturing tags to complete both the phonetic word and the valid word. One has captured his full word if either one is "recreated" fully.

While player 1 is declaring, i.e., selecting and recording, player 0 is also selecting and recording his sentence (focus) within his chosen field. As above, Player 0 chose "The patterned signal from deep space gave hope for the meeting." For "patterned" it is seen from FIG. 8, that the phonetic tag (the first phonetic) is P and the numerical code therefor is 865. The semantic tag is "structure/ambience" with code 439, and the field/focus tag is "aim/vote" with code 31. The phonetic equivalent is P-AT-ERN-D. Player 0 will play the binary codes for this valid word, and in turn will read and capture from the offerings of player 1.

The game can be played with any number of players. With only two, however, the number of tags offered for capture will be limited, and it will be difficult to capture enough bytes to assemble a complete phonetic word. For this reasons two players will preferably each play two sets of encodements, to increase the bytes offered for "capture".

As shown in FIG. 7, player 1 accordingly for his second set has also selected the field of "leisure", and a focus within that field of "Central Park was full of strollers lazily sidling through reclining picnickers". Player 0 has likewise chosen as a second field "space" and the focus of "Stuttering sinewaves whispered of probing intelligence housed in some microbionic network."

The second set of encodements for player 1 is labeled the D1 set, and the second set for player 0 is labeled the D0 set.

The valid and phonetic "word" declarations thereof are shown in FIGS. 7 and 8.

It will be noticed that each sentence in this game comprises eleven words, and there are three carrier frames to be used for each word. That is, the phonetic, semantic and field/focus tags for each word each require one carrier register to display the binary code for it.

In order to complete play of each sentence, each player will thus play three sets of eleven times three, thirty-three, carrier frames—three per word, and record from the playing of the like number by his opponent.

The players record the binary codes played by the opponent on a chart such as shown in FIG. 12, and also record "translations" of the codes. As stated, the recorder is primarily interested in recording words and portions thereof he can use to "recreate" his own chosen and "declared" words.

Figure 9:
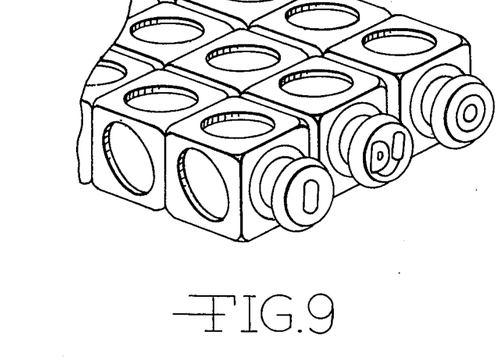
FIG. 9 is a fragmentary isometric view showing several carrier frames.

3. The Bit Playoff Routine entails placing binary coded sets of carrier frames side-by-side as shown in FIG. 9, reading and recording the odd bits in columns of three, and then deciding which player has the largest number of odd bits in 10 three-bit columns, or, if there is a tie, that fact is noted. If there is a winner, the winning party "captures" all the bits of that playoff. If a tie, then each may use all the bits and their symbolic codes.

Figure 10:
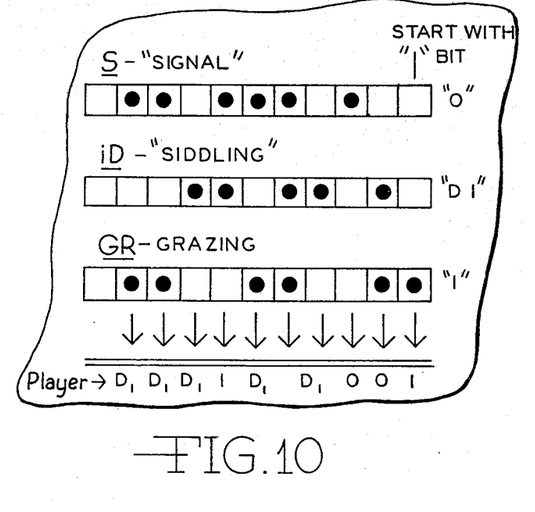
FIG. 10 is a plan view of a recorded playoff.
Figure 11:
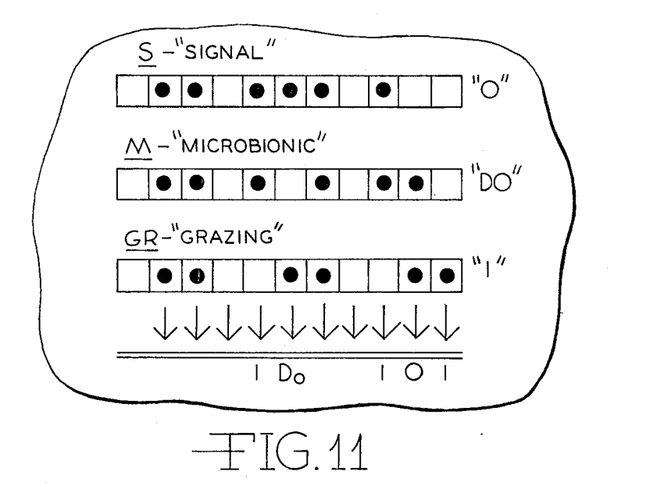
FIG. 11 is a plan view of a recorded playoff.

FIG. 9 shows a playoff of bits, and FIGS. 10 and 11 show recordings of such playoffs in a manner such that the winners can be determined.

In these playoffs first one player puts two carrier registers in play, and then the other player puts one carrier register in play, thus forming the three of FIG. 9. Next, the results are recorded. Then, the second player puts two carrier registers, and the first player one, with recording taking place thereafter.

In the bit playoff, first player 1 will set down two carriers, one for his "1" and one for his "D1" senarius, set for the binary phonetic tags of valid words, and player 0 will place one carrier set for his "0" scenario; also showing a valid word phonetic tag. The "0" carrier will be placed adjacent to the "1" and "D1" carriers, as illustrated in FIG. 9. The resulting arrangement will be observed and written on the score sheet of FIG. 10. The "odd bit" winner will be noted and listed below for each set of opposing bits. In the playoff of FIG. 10, the carrier D1 of player 1 has five odd bits as compared with the other two registers. Starting at the left it can be seen that a naught appears on D1 opposite a "1" on carrier "0" and a "1" on carrier "1". Thus, for this bit column D1 has the odd bit and is the odd bit winner. For the complete set of three carriers more columns show an odd bit for "D1" than for the other two. Thus, "D1" won this "odd bit playoff". Player 1 now can record all of the bits shown on the record sheet FIG. 10, for the D1 set of words. But these cannot be mixed with his "1" theme set. For the second "bit playoff" routine (FIG. 11) the carrier frames 1, 0 and D0 are "played". Again, they are selected at random. Third "words" of a theme do not have to be played against third "words". The 1 set of player "1" wins the second bit playoff. The winnings can be recorded on his record sheet for his player "1". If there were a tie, all three can be recorded for each of the three themes played. Thus if the number of odd bits for the 1, 0 and D0 frames in FIG. 11 were equal, player "1" would record all the bits on his "1" record, and player "0" would record all bits on both his "0" record and his "D0" record.

When the carrier frames are set for each read routine they will expose not only the bits for the selected tags through one face, but additional bits will be shown through the openings in the other three carrier frame faces. The winner of each bit routine will also be entitled to use these additional bits and will record them and their "translations" he has chosen for them from the full register.

The players, as above, record the bits they have read in the "read routines", and "won" in the "bit routines" on charts such as shown in FIGS. 10 and 11, and also on sheets, such as those of FIG. 12.

The players can use these readings and winnings of bits in any way they choose. Thus, they could be used individually or collectively to create any of the sound or meaning tags they would find useful in recreating their respective scenarios and parts thereof, or in "guessing" what the opponent "declared" before starting.

4. The Call Routine

After each Read Routine and after each Bit Playoff Routine, there is also a Call Routine. That is after each player records his readings, and/or his winnings from a Bit Routine. In the Call Routine the players will announce what meaning has been given to the respective bytes. Each announces, i.e., calls, whether he will use the 10-bit bytes as sound, meaning or theme/focus tags, as well as the specific tags. The calls are recorded by one's opponent. Thus the opponent has a record of what the calling player has assigned. The latter will be useful in guessing those yet unvocalized and unplayed "words" of the opposite party.

5. Assembly Routine

After three bytes of play by each party, each player assesses his options for completing his precoded (declared) words using the codes he has now recorded, as they were captured. For the Assembly Routine the player can also modify bits in a byte to conform that byte to a code useful for him. However, for each bit changed, a point is deducted from the 10 point scoring base of a full byte. Therefore the player can assemble the meanings he can make from the codes he has acquired in an attempt to recreate one of his sentences and portions thereof.

As above, there are legal words, valid words and phonetic words. The objective of the game is to capture portions of words to recreate one's own declared words in their valid and/or phonetic form.

As a further explanation of play: one player may have placed the digital code for 885 on the board. The opponent then searches along the carrier registers until he sees a match for the digital code. Somewhere along the side by side registers there will be a digital match across the register for the code in the facing carrier frame. The opponent can now select the phonetic, the semantic, or the field or focus tags, appearing with the matching code, for use in recreating his declared words. He will then record and call, i.e., declare, his selection. Thus, one read routine is completed.

The opponent may, for example, read code 885 as S, and call that he has given this the meaning S. He will record this on his sheet in a place where he will find S useful. With reference to FIGS. 7 and 12, the opponent "0" who selected "Massive brown cow", records 885 on his sheet 12 as having the meaning S. As indicated in FIG. 7, S can be used to create one "valid" word part, a phonetic S. This has now been captured and it is useful for creating a word. If the phonetic tag was not useful, at capture, for creating the opponent's words, it could nonetheless still be recorded on the chart of FIG. 12, and a call meaning announced for it. It may be useful later.

It will be seen that there is provided in a preferred form of the invention a game in which two or more players can be involved and in which encodement and digitizing are involved. By using prearranged code sets and selecting from agreed spheres or fields of knowledge or activities or substances, coded bits of information can be transmitted from one player to the other. The receiving player can then select from prearranged code sets matching codes which he can use to create portions and finally all of a set of themes or ideas which he has previously arranged. In other words, players in the game select from previously arranged fields of thought scenarios which appeal to them, arrange certain sentences concerning such scenarios, and codify these using a previously agreed upon code. These codes are in the form of semantic and phonetic symbols as well as field/focus symbols forming a symbolic alphabet. The alphabet is of a nature such that the entire range of the language, the venacular which is used by the participants, for example, can be covered.

The code has certain characteristics such that several choices of encoding symbols may be employed for any given words of the language, and for the portions thereof, that is, the phonemes. A receiving player matches the codes that are transmitted to him with a prearranged set of codes and from these selects portions of words which may be of use to him in recreating a scenario of words he has previously selected. According to the invention, there is also provided the concept of digitizing the codes and transmitting them in binary digital form. Thus, not only does there exist the possibility of creating a game, but one can transmit messages to another over a distance. Therefore, message transmission is also possible utilizing the concepts of the instant invention.

The method of playing the game consists of the steps of selecting information to be transmitted to an opponent. Selecting thereafter symbols for said information from a code. Next, transmitting the coded information from one player to another, and placing it in alignment with a second prearranged set of symbols. There are symbols on the latter set which match the coded symbols which were sent. Thereafter the matched symbols are recorded.

In another sense the method also includes the steps of digitizing the coded information, and transmitting it from one player to another in digital form. The receiving player matches the digital information received with digital indicia associated with the prearranged set of symbols.

While I have shown and described preferred forms of the invention, it will be understood that other forms and variations can be devised within the scope of the invention and that accordingly the invention is to be limited only to the claims appended hereto.

I claim:

1. An encoding game device, comprising:
an elongated carrier frame formed of flexible resilient material and comprising a predetermined plurality of compartments interconnected by reduced sections;
said elongated carrier frame having a substantially rectangular cross section;
each said compartment having in its interior a spherical chamber (26, 28) and a plurality of recesses (46);
a predetermined plurality of spheres rotatably mounted in said spherical chambers so that each said spherical chamber contains one of said spheres;
each said sphere having a plurality of nodes (48) adapted to be received in said recesses (46), said nodes (48) and said recesses (46) together serving to fix said rotatable sphere in a selected position;
said flexible resilient elongated carrier frame being provided with a receptacle (22) at one end thereof and a plug (24) at the opposite end thereof;
said plug and receptacle being of mating sizes so that said plug is adapted to be received in a mating receptacle on an adjacent flexible resilient elongated carrier frame whereby a series of flexible resilient elongated carrier frames may be interconnected;
each of said rotatable spheres being provided with six indicia thereon, with three of said six indicia representing a binary digit 0, and the remaining three of said six indicia representing a binary digit 1;
said six indicia being mounted on each said rotatable sphere in raised sections (40);
each said indicia representing the binary digit 0 being provided with a smooth indicia background section (42), and each said indicia representing said binary digit 1 being provided with a rough indicia background section (44), to permit visual and tactile sensing of said binary digits 0 and 1; and
each of said interconnected compartments being provided with four openings (18) through which game players may visually and tactilely sense said binary digits, said four openings (18) being spacially arranged in their associated compartment whereby four of said six indicia carried by said rotatable sphere are simultaneously displayed through said four openings so that each of said four openings displays only one of said four indicia at any given instant.

2. The game device of claim 1, wherein:
said nodes (48) and said recesses (46) comprise detent means for maintaining said spheres in selected indicia-displaying positions.

3. The game device of claim 1, wherein:
said elongated carrier frame is flexible to facilitate rotation of said spheres and having at least four spaced openings adjacent each sphere whereby said spheres can be rotated into a desired indicia-exposing position by manipulation from exteriorly of said elongated carrier frame.

4. The game device of claim 1, wherein:
said spheres have 0 and 1 binary digit code indicia at spaced intervals, the latter indicia being in relief, and the surface area of said spheres immediately surrounding each digit being textured differently for said 0 binary digit code indicia than for said one binary digit code indicia.

5. The game device of claim 1, wherein:
said carrier frame constitutes an elongated member having spaced sphere receptacles and openings extending longitudinally along said member.

6. The game device of claim 1, including:
a series of code-identifying registers, one for each sphere, adapted to be placed closely adjacent and in alignment with each sphere and having binary and decimal indicia, for correspondence to that on said spheres.

7. The game device of claim 6, wherein:
said code-identifying registers comprise elongated members having a series of indicia spaced therealong and being adapted to be placed in a plane extending perpendicularly of said spheres with one end thereof being immediately adjacent a respective one of said spheres.

8. The game of claim 6, wherein:
said code-identifying registers contain numerical identification plus spaced indicia-indicating semantic tags to which predetermined words may be attributed.

9. The game device of claim 6, wherein:
said code-identifying register include numerical identification, and indicia indicating phonetic and semantic equivalents for said numerical identification.

10. The game of claim 6, wherein:
said code-identifying registers bear indicia of three stages of encodement, namely, phonetic, semantic and theme indicia.

* * * * *